(12) United States Patent
Nagano

(10) Patent No.: US 8,046,817 B2
(45) Date of Patent: Oct. 25, 2011

(54) CONTENT REPRODUCING APPARATUS, METHOD, AND MEDIUM

(75) Inventor: Kae Nagano, Tokyo (JP)

(73) Assignee: Sony Corporation, Tokyo (JP)

( * ) Notice: Subject to any disclaimer, the term of this patent is extended or adjusted under 35 U.S.C. 154(b) by 617 days.

(21) Appl. No.: 12/167,299

(22) Filed: Jul. 3, 2008

(65) Prior Publication Data

US 2009/0037954 A1 Feb. 5, 2009

(30) Foreign Application Priority Data

Jul. 5, 2007 (JP) ................................. 2007-177049

(51) Int. Cl.
*H04N 7/173* (2011.01)
*H04N 5/445* (2011.01)

(52) U.S. Cl. ............. 725/134; 725/58; 725/59; 725/110

(58) Field of Classification Search ................... 725/51, 725/59, 132, 58, 110, 112, 134
See application file for complete search history.

(56) References Cited

U.S. PATENT DOCUMENTS

| | | | |
|---|---|---|---|
| 7,773,859 B1 * | 8/2010 | Potrebic et al. ............... | 386/291 |
| 7,793,326 B2 * | 9/2010 | McCoskey et al. ............. | 725/91 |
| 2002/0166121 A1 | 11/2002 | Rovira | |
| 2003/0167471 A1 | 9/2003 | Roth et al. | |
| 2004/0221308 A1 * | 11/2004 | Cuttner et al. .................. | 725/46 |
| 2007/0101375 A1 * | 5/2007 | Haberman ....................... | 725/86 |
| 2007/0214488 A1 * | 9/2007 | Nguyen et al. ................ | 725/134 |

FOREIGN PATENT DOCUMENTS

| | | |
|---|---|---|
| EP | 1 187 467 | 3/2002 |
| EP | 1 732 251 | 12/2006 |
| JP | 2003-125305 | 4/2003 |

OTHER PUBLICATIONS

European Search Report dated Nov. 18, 2008 from the European Patent Office for corresponding European Application No. 08 25 1948, (3 pages).

* cited by examiner

*Primary Examiner* — William Trost, IV
*Assistant Examiner* — Chris Parry
(74) *Attorney, Agent, or Firm* — Finnegan, Henderson, Farabow, Garrett & Dunner, L.L.P.

(57) ABSTRACT

A content reproduction method is provided. First, a broadcast program having a program content is received and electronic program guide data including program information on the broadcast program is received. Then, a content corresponding to the program content of the broadcast program is retrieved from a network based on the electronic program guide data. Finally, identification information identifying the content is displayed with the program information.

18 Claims, 12 Drawing Sheets

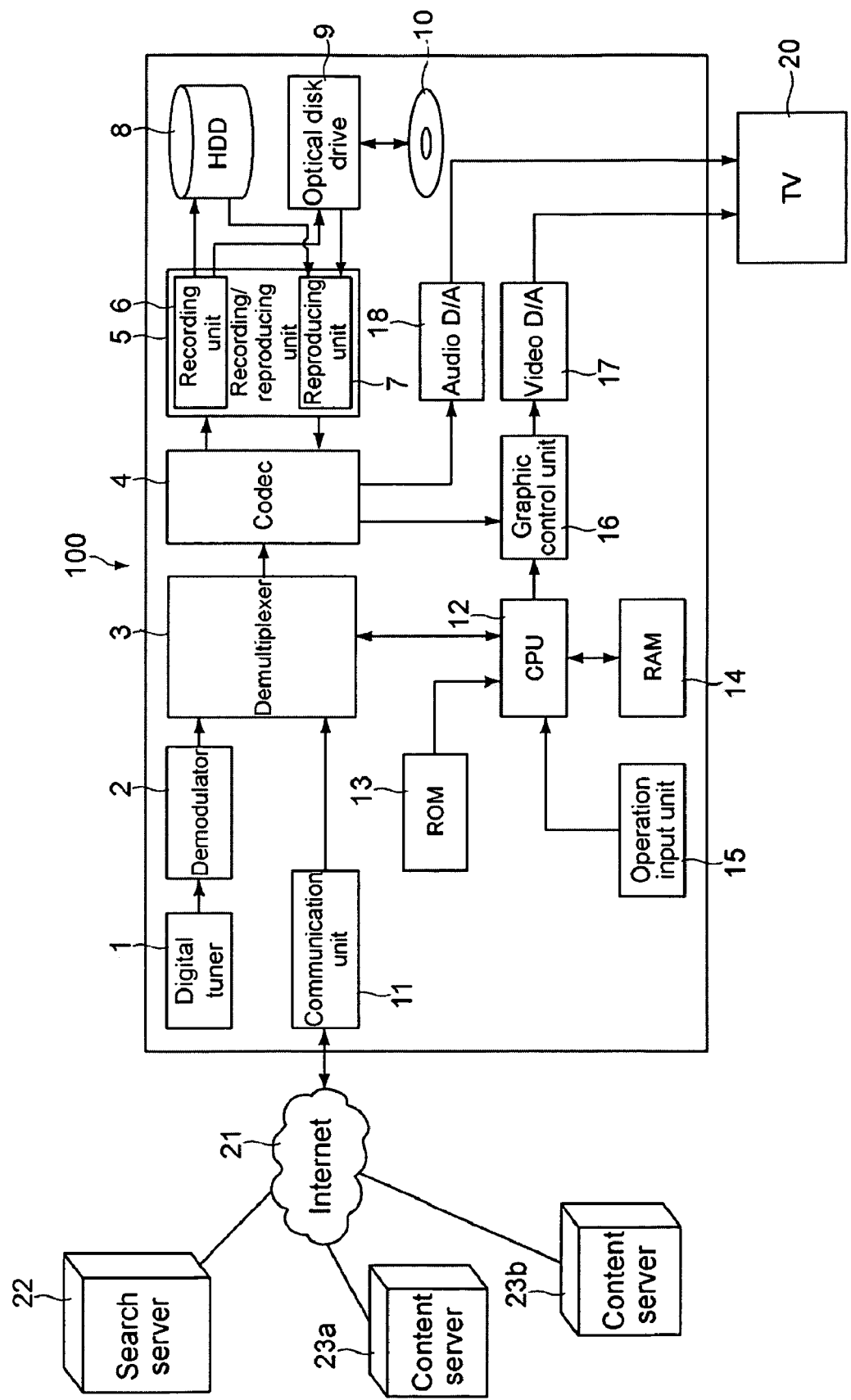
[FIG.1]

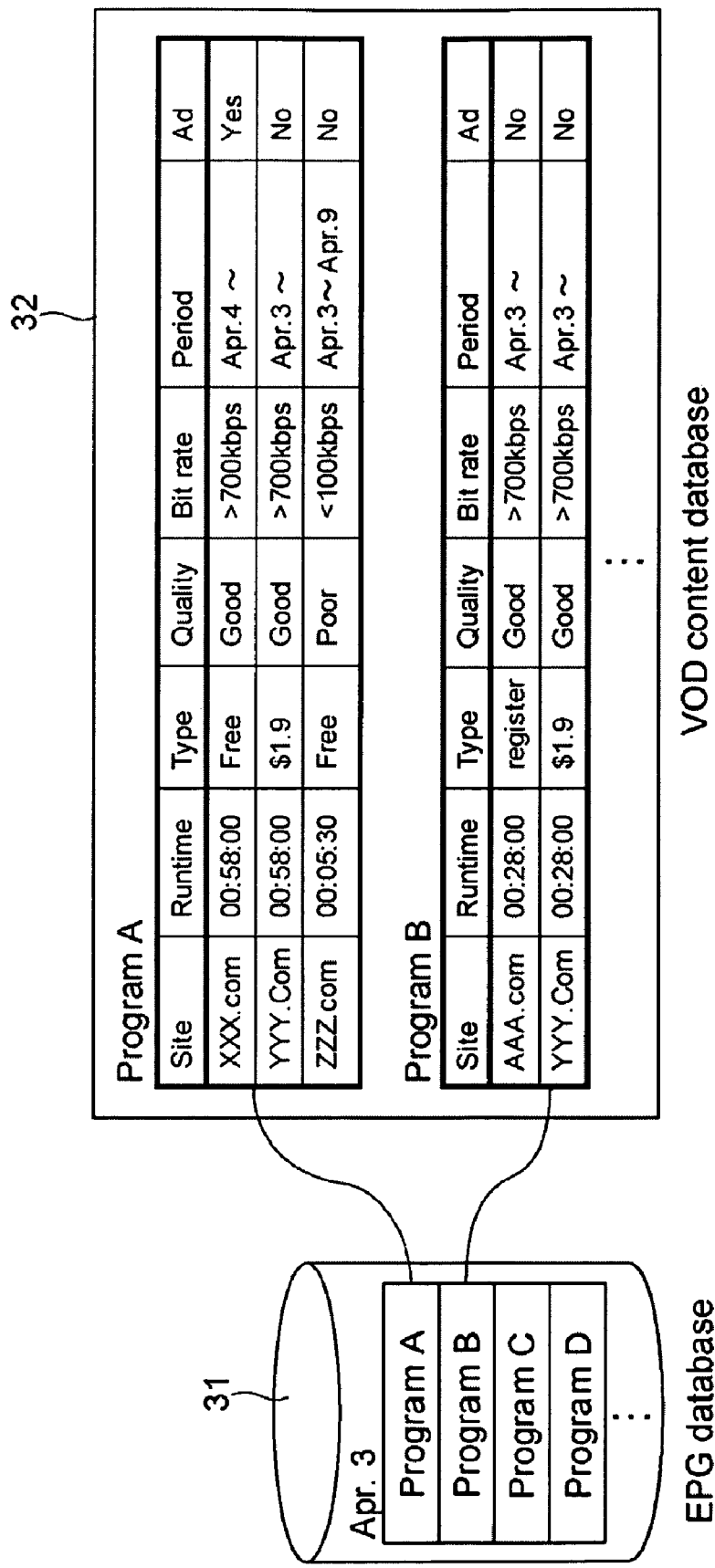
[FIG.2]

[FIG.3]
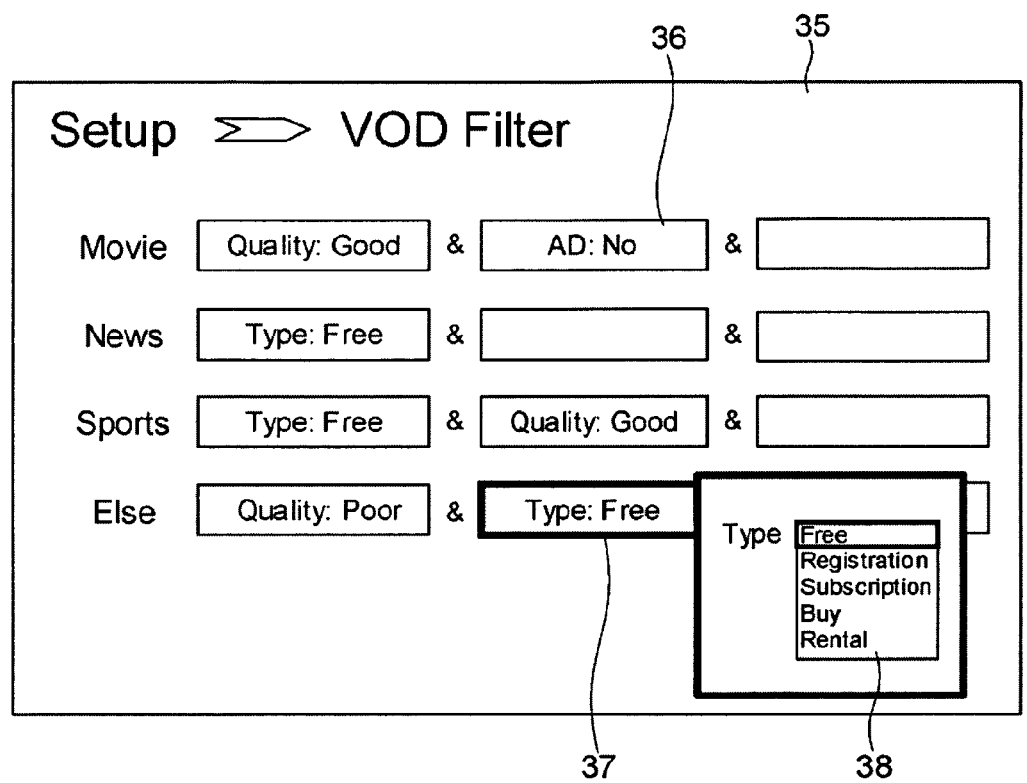

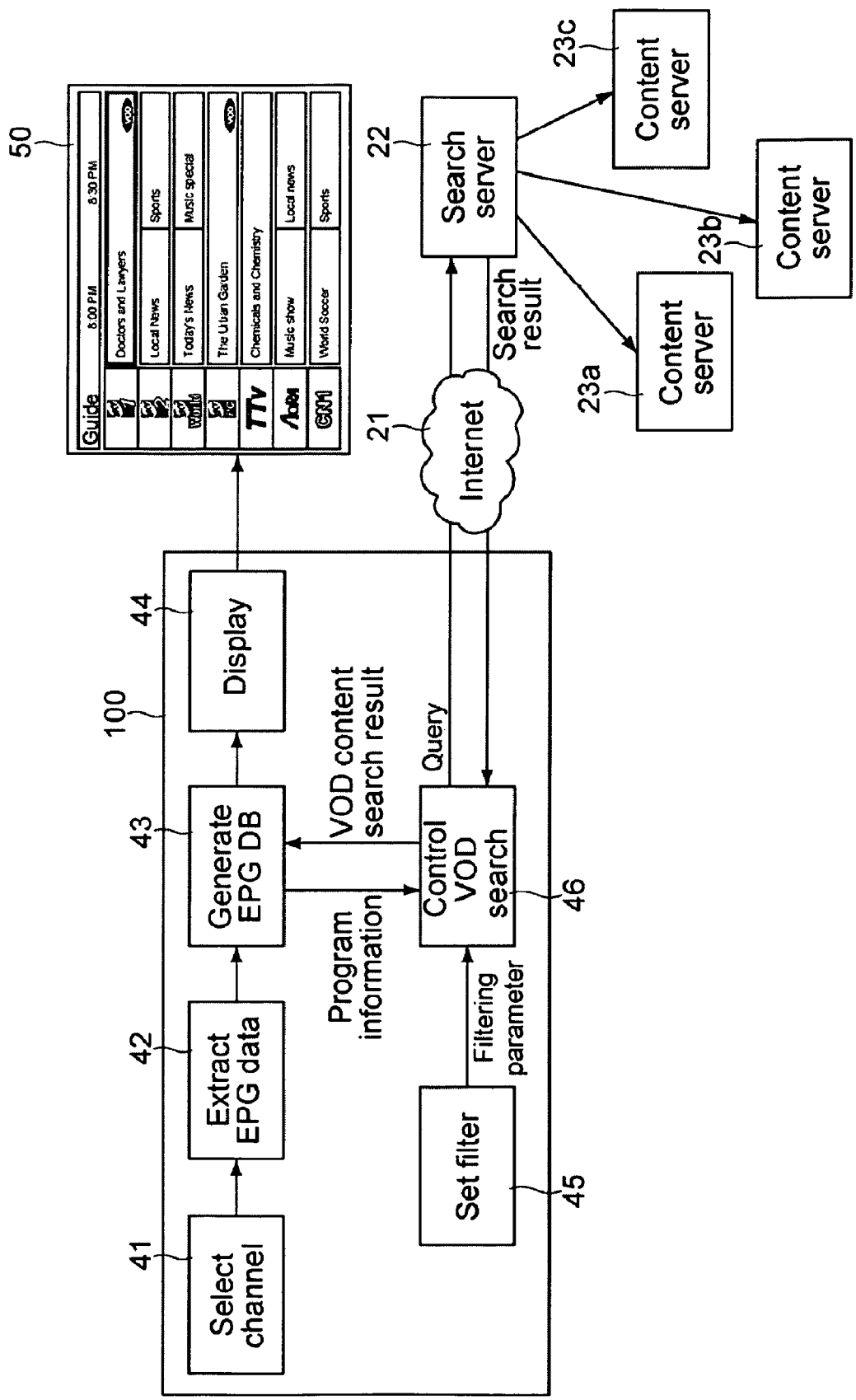
[FIG.4]

【FIG.5】

| Guide | 8:00 PM | 8:30 PM | |
|---|---|---|---|
| SKY 1 | Doctors and Lawyers | | VOD |
| SKY 2 | Local News | Sports | |
| SKY World | Today's News | Music special | |
| SKY PC | The Urban Garden | | VOD |
| TTv | Chemicals and Chemistry | | |
| AoRA | Music show | Local news | |
| CN1 | World Soccer | Sports | |

[FIG.6]
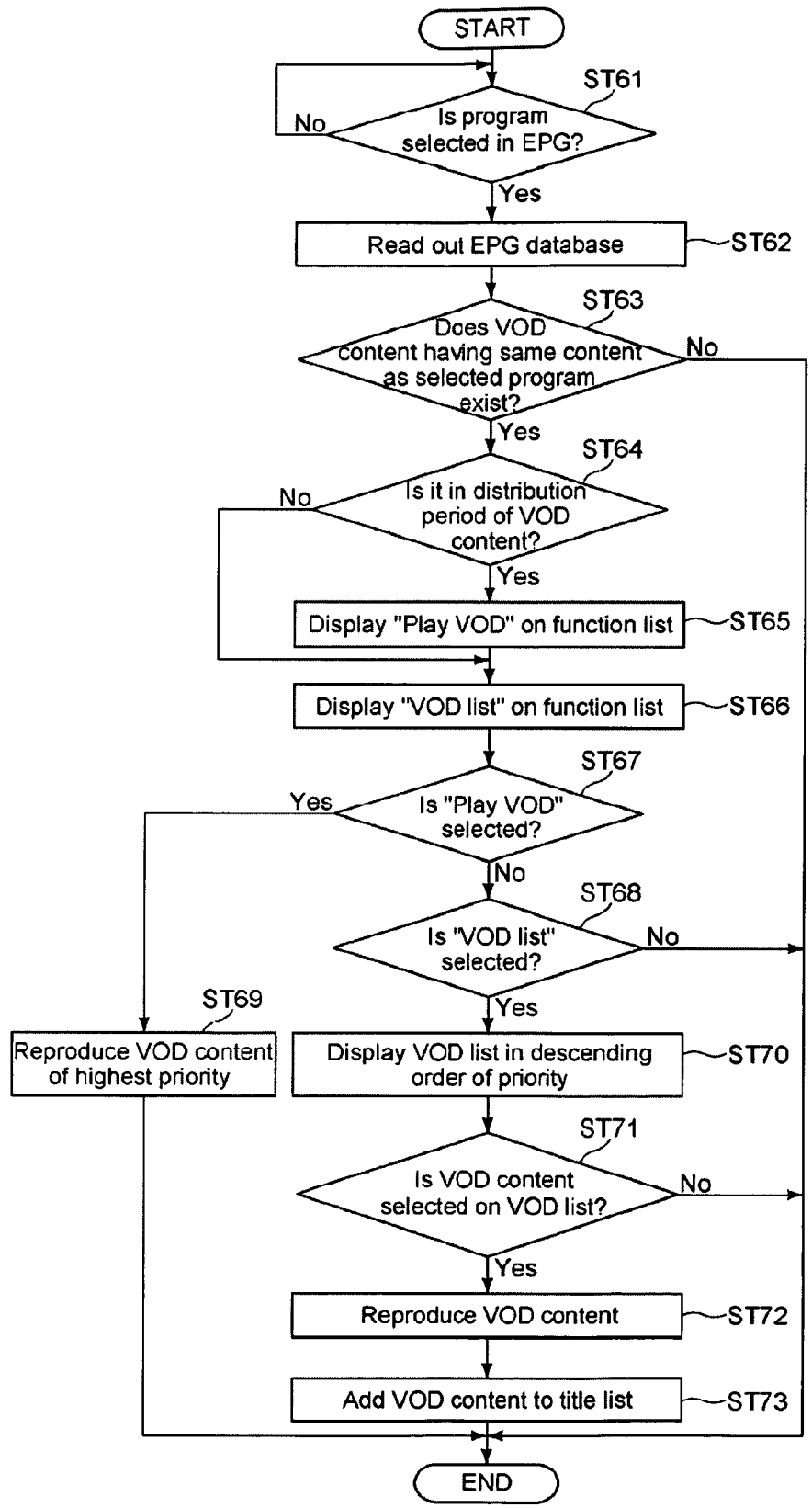

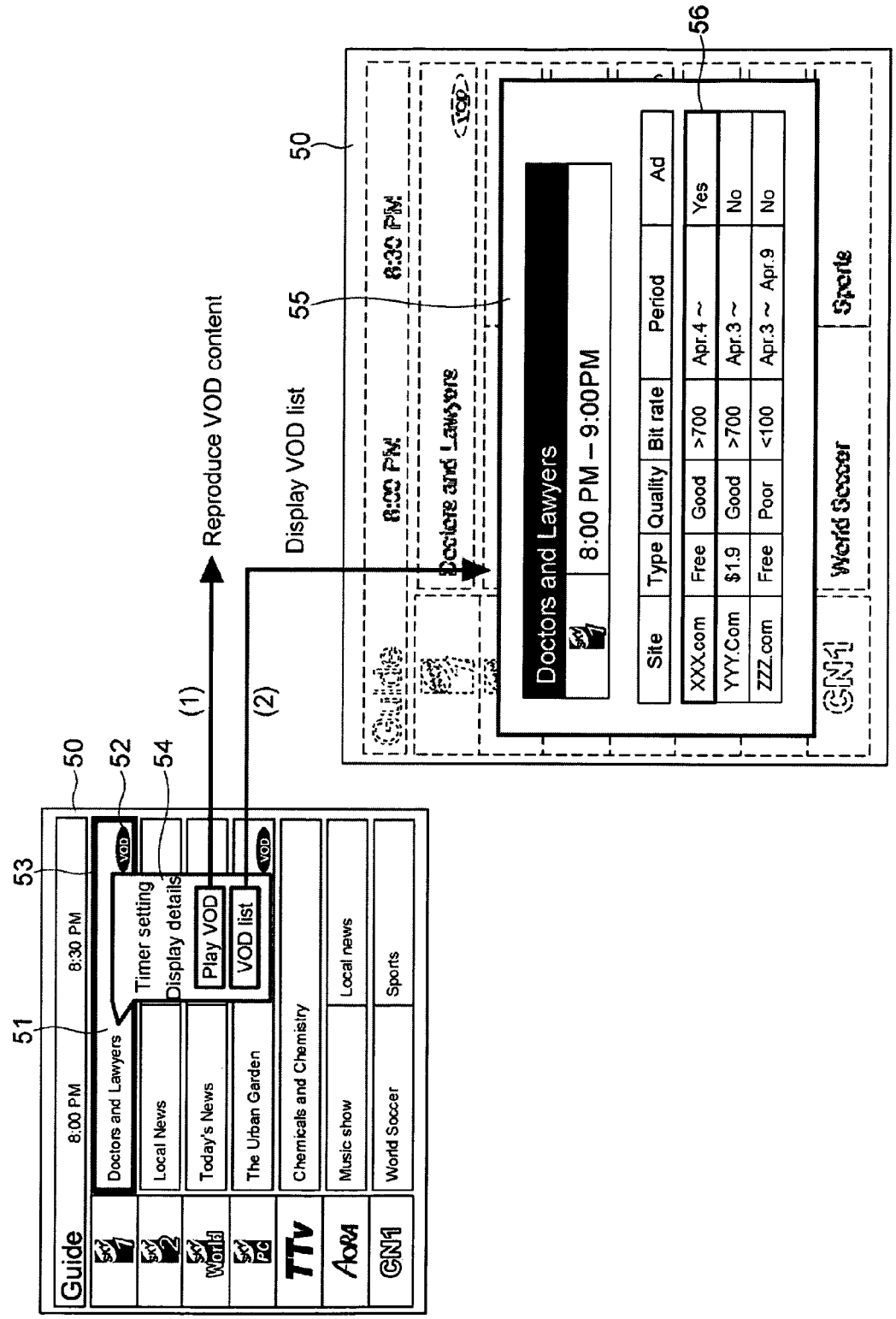
[FIG.7]

[FIG.8]
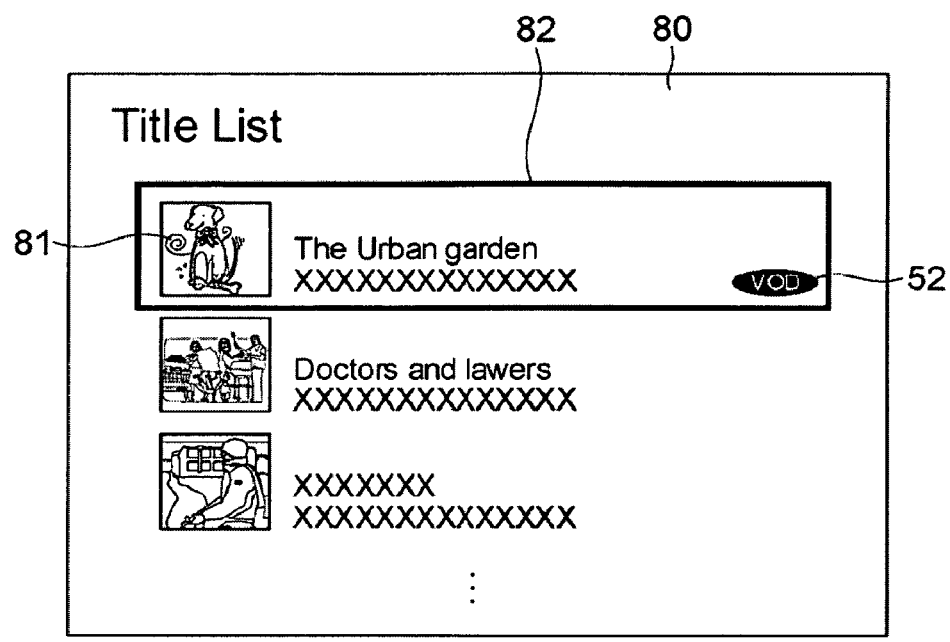

[FIG.9]
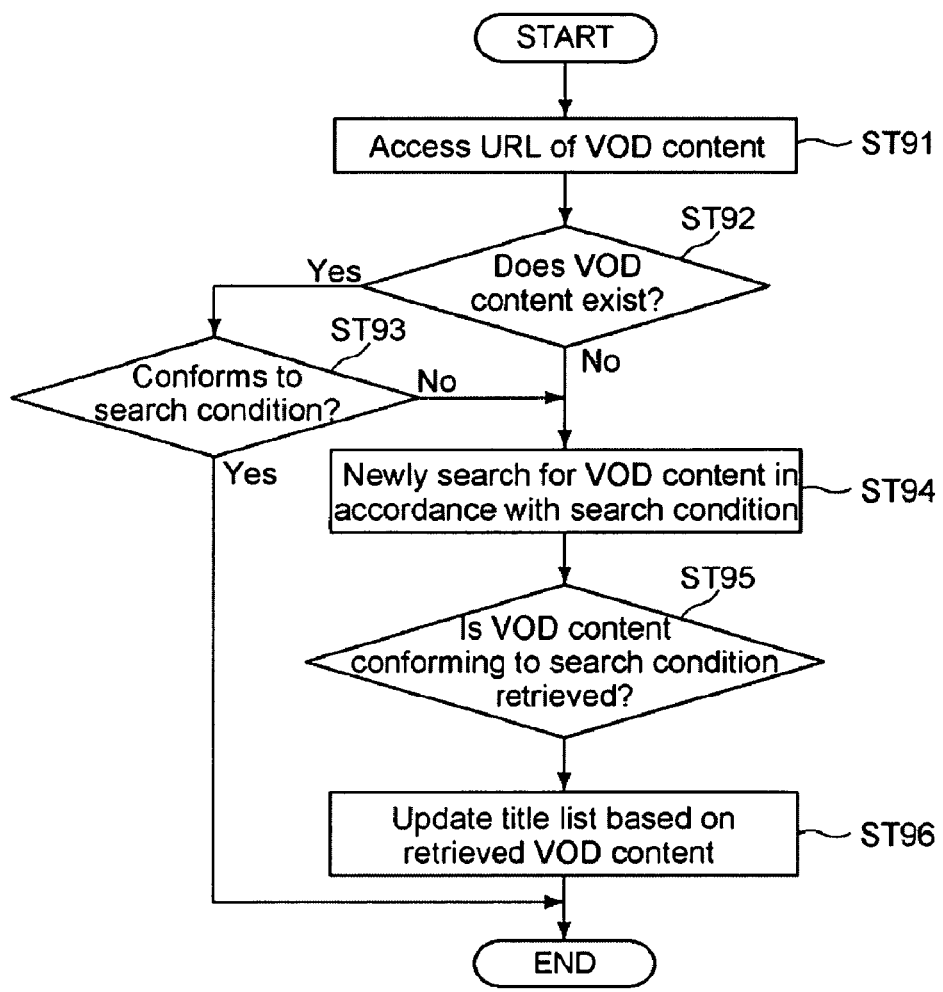

[FIG.10]
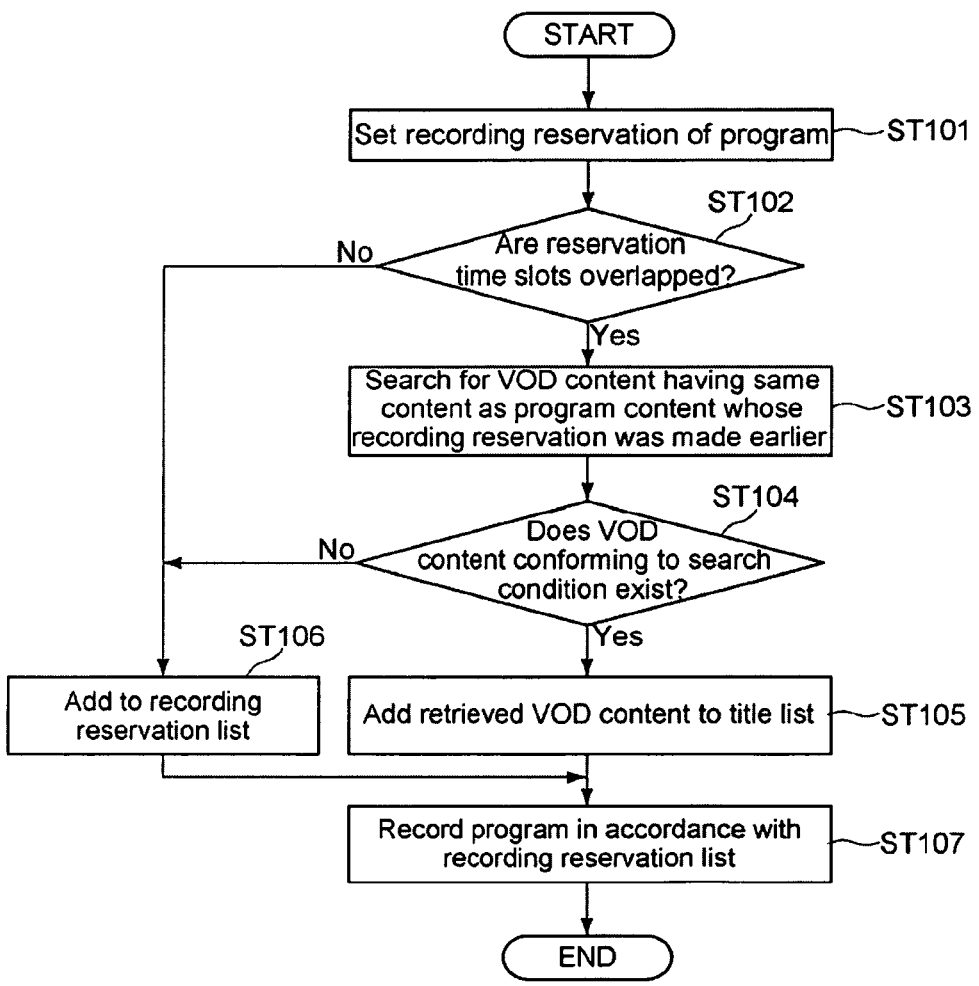

[FIG.11]
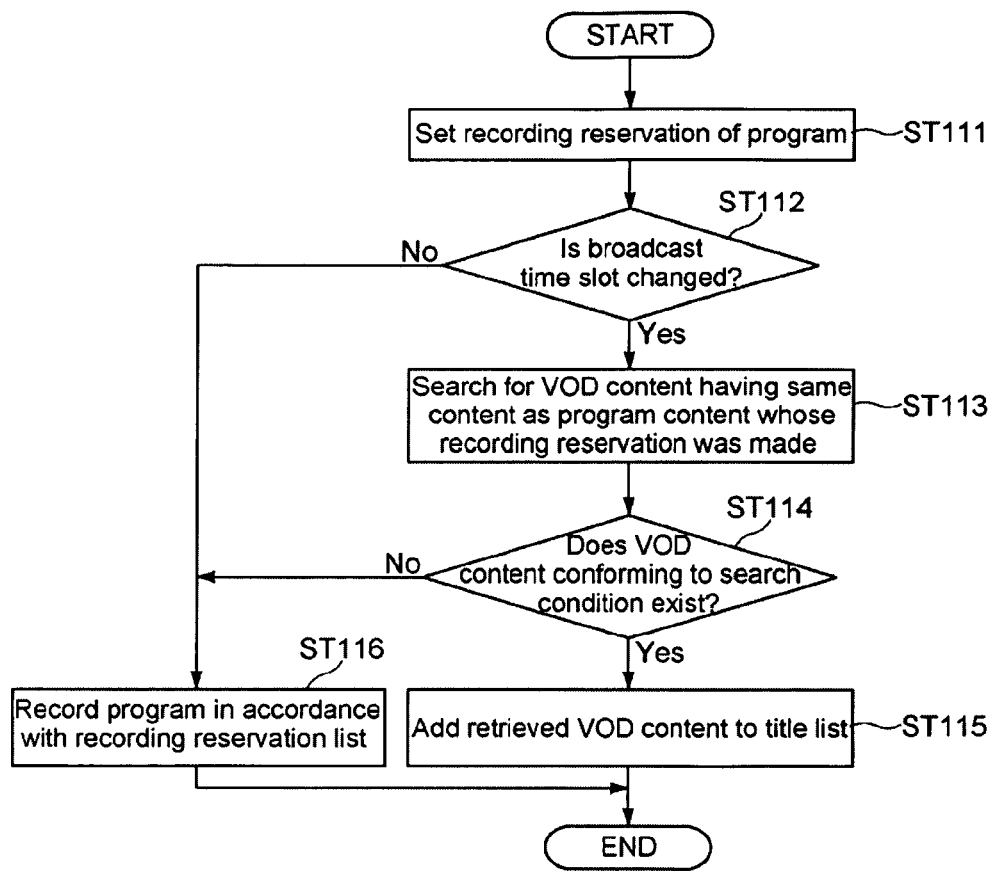

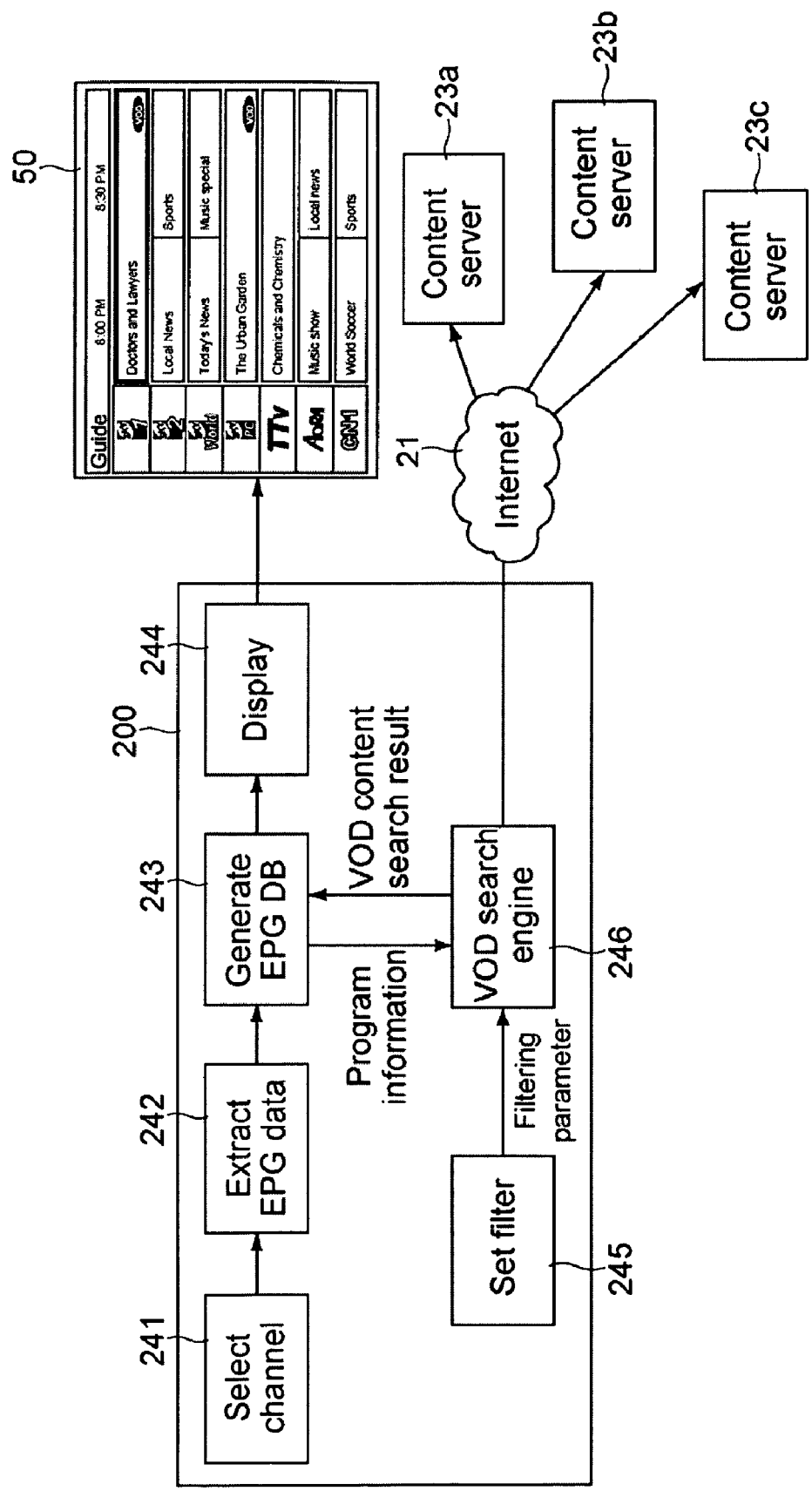
[FIG.12]

CONTENT REPRODUCING APPARATUS, METHOD, AND MEDIUM

BACKGROUND

1. Technical Field

The present invention relates to an electronic apparatus, a method, and a computer-readable medium for receiving and reproducing broadcast programs and contents on networks.

2. Related Art

In the past, electronic apparatuses such as a television apparatus receive broadcast signals of terrestrial broadcasting, cable television broadcasting, and satellite broadcasting, and allow users to view broadcast programs. The broadcast programs are previously scheduled to be broadcasted in pre-determined time slots. So when users want to view broadcast programs, they must view the programs in broadcast time slots of the broadcast programs or set recording reservation of the broadcast programs.

Meanwhile, as a broadcast environment has developed recently, services that allow users to view contents corresponding to program contents of broadcast programs through a network such as the Internet have come into use. Most of the services employ a so-called video on demand (VOD) system. Users can view contents anytime they want without being bound by broadcast time slots.

However, there are various ways of obtaining contents that can be viewed with the VOD, so users must search the plurality of ways of obtaining desired contents. Furthermore, users can refer to electronic program guides (EPGs) obtained by electronic apparatuses through broadcast waves or through a network, select desired broadcast programs, and confirm their schedules. However, the users cannot obtain from the EPGs whether they can view contents corresponding to the program contents of the broadcast programs through the Internet with VOD. So, the users are forced to execute troublesome, additional search for contents of VOD by using, for example, search engines on the Internet.

Japanese Patent Application JP 2003-125305 describes a television receiver capable of obtaining a program title and uniform resource locator (URL) referring to program information in an electronic program guide to a hard disk recorder connected to the television apparatus while viewing a broadcast program, searching the Internet using a personal computer for program auxiliary information on the broadcast program based on the program title and the URL, and displaying the program auxiliary information.

However, in the television receiver described in JP 2003-125305, the information retrieved from the Internet and displayed on the personal computer is merely auxiliary information regarding the broadcast program such as, for example, comments on the broadcast program and information on a cast, but information regarding a content on the Internet corresponding to the program content of the broadcast program is never displayed. Thus, users are still bound by broadcast schedules to view broadcast programs, and are forced to execute troublesome search operations to confirm whether a content corresponding to the program content of the broadcast program exists on the Internet.

SUMMARY

In view of the above, an electronic apparatus, a method, and a computer-readable medium are provided that can allow a user to select and view one of a broadcast program and a content on a network according to the user's preference.

Consistent with an embodiment of the present invention, an electronic apparatus is provided. The electronic apparatus comprises first reception means for receiving a broadcast program having a program content. The electronic apparatus further comprises second reception means for receiving electronic program guide data including program information on the broadcast program. The electronic apparatus further comprises retrieval means for retrieving a content corresponding to the program content of the broadcast program from a network based on the electronic program guide data. The electronic apparatus further comprises display means for displaying identification information identifying the content such that the identification information is shown with the program information.

Consistent with an embodiment of the present invention, a content reproduction method is provided. The method comprises receiving a broadcast program having a program content. The method further comprises receiving electronic program guide data including program information on the broadcast program. The method further comprises retrieving a content corresponding to the program content of the broadcast program from a network based on the electronic program guide data. The method further comprises displaying identification information identifying the content such that the identification information is shown with the program information.

Consistent with an embodiment of the present invention, a computer-readable medium having computer programs is provided. The computer programs, when executed by a processor, cause an electronic apparatus to perform a content reproduction method. The method comprises receiving a broadcast program having a program content. The method further comprises receiving electronic program guide data including program information on the broadcast program. The method further comprises retrieving a content corresponding to the program content of the broadcast program from a network based on the electronic program guide data. The method further comprises displaying identification information identifying the content such that the identification information is shown with the program information.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, show certain aspects of implementations consistent with the present invention and, together with the description, help explain some of the principles associated with the invention.

FIG. 1 illustrates an exemplary configuration of a recording/reproducing apparatus.

FIG. 2 illustrates an exemplary EPG database and an exemplary VOD content database corresponding to programs in the EPG database.

FIG. 3 is an exemplary setup screen of a VOD filter.

FIG. 4 illustrates an exemplary operation of searching for the VOD content by the recording/reproducing apparatus and displaying an EPG.

FIG. 5 is an exemplary EPG.

FIG. 6 is a flowchart illustrating an exemplary operation by the recording/reproducing apparatus of reproducing the VOD content based on an EPG.

FIG. 7 illustrates how the VOD content is reproduced with the EPG.

FIG. 8 is an exemplary title list.

FIG. 9 is a flowchart illustrating an exemplary operation by the recording/reproducing apparatus of updating the title list.

FIG. 10 is a flowchart illustrating an exemplary operation of the recording/reproducing apparatus in a case where recording reservations are overlapped in time.

FIG. 11 is a flowchart illustrating an exemplary operation of the recording/reproducing apparatus in a case where a broadcast time slot of a recording-reservation-target program content is changed.

FIG. 12 illustrates an exemplary operation by a recording/reproducing apparatus of searching for a VOD content to display an EPG.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

As shown in FIG. 1, a recording/reproducing apparatus 100 may be connected to a television apparatus 20 including a display unit (not shown), and connected to a search server 22 and a plurality of content servers 23 (23a and 23b) via Internet 21.

Recording/reproducing apparatus 100 can includes a digital tuner 1, a demodulator 2, a demultiplexer 3, a codec 4, a recording/reproducing unit 5, a hard disk drive (HDD) 8, an optical disk drive 9, a communication unit 11, a central processing unit (CPU) 12, a read only memory (ROM) 13, a random access memory (RAM) 14, an operation input unit 15, a graphic control unit 16, a video digital/analog (D/A) converter 17, and an audio digital/analog (D/A) converter 18.

Digital tuner 1 may be controlled by CPU 12 to select a specific channel of digital broadcasting via an antenna (not shown) and to receive a broadcast signal including a broadcast program data. The broadcast signal may be, but not limited to, an MPEG stream encoded in, for example, an MPEG-2 TS format. Demodulator 2 may demodulate the modulated broadcast signal.

Demultiplexer 3 may separate the multiplexed broadcast signal into a video signal and an audio signal. Codec 4 may decode the compressed video signal and audio signal separated by demultiplexer 3. Further, codec 4 may transcode, depending on an output target of each of the video signal and the audio signal, a format of each signal to a different format.

Recording/reproducing unit 5 may include a recording unit 6 and a reproduction unit 7. Recording unit 6 may receive as input and temporarily store the video signal and audio signal decoded by codec 4, and output the signals to HDD 8 and optical disc drive 9 to cause them to record the signals while controlling a timing and a data amount. Reproduction unit 7 may read out the video signal and audio signal of a content recorded in HDD 8 and optical disk drive 9, and output the signals to codec 4 to cause codec 4 to reproduce the signals while controlling the timing and the data amount.

HDD 8 may store, in a built-in hard disk, a broadcast program data (hereinafter referred to as program content) received via digital tuner 1 and various contents including a video content of the VOD (hereinafter referred to as VOD content) provided by content servers 23 on Internet 21, various video contents, static image contents, and music contents input from a digital camera or other recording media via various interfaces (not shown). HDD 8 may further store various programs of an operating system (OS), applications, and other data. HDD 8 may record a title list in which the program content and VOD content denoted by respective titles are listed such that the contents can be reproduced. In a case where the stored data are reproduced, HDD 8 may read the data from the hard disk to output the data to recording/reproducing unit 5.

Optical disk drive 9 can be mounted with optical disk 10, and, similar to HDD 8, can record the various data including the program content on optical disc 10 and read out the recorded data. Examples of optical disk 10 may include DVDs (DVD-Video, DVD-RAM, DVD-R, DVD-RW, DVD+R, DVD+RW, etc.), a Blu-ray disc (BD), and a compact disc (CD).

Communication unit 11 may be connected to Internet 21 and serve as a network interface for exchanging the various data with search server 22 and content server 23 based on a protocol such as TCP/IP (Transmission Control Protocol/Internet Protocol).

CPU 12 may access RAM 14 and other components when necessary and may integrally control each component in recording/reproducing apparatus 100. CPU 12 may controls, for example, data recording/reproducing processing by recording/reproducing unit 5 and VOD content search processing using search server 22. Further, the broadcast signal contains a service information (SI) signal for transmitting the EPG data. CPU 12 may control a processing for extracting the EPG data from the SI signal to create an EPG database, and for causing television apparatus 20 to display the EPG data. Reproduction/recording apparatus 100 may obtain the EPG data from Internet 21 via communication unit 11 instead of obtaining from the broadcast signal received by digital tuner 1.

ROM 13 is a nonvolatile memory in which an OS to be executed by CPU 12 and firmware such as a program and various parameters are fixedly stored. RAM 14 may be used as a working area of CPU 12, and is a memory for temporarily retaining an OS, a program, a processing data, etc. RAM 14 may store the EPG database created by CPU 12 and a VOD content database associated with the EPG database.

Operation input unit 15 may receive various setting values and commands as input from a remote controller (not shown) having a plurality of keys operated by a user and output the values and commands to CPU 12. As an alternative to operation input unit 15 being operated by the remote controller, operation input unit 15 may be configured by a keyboard or a mouse connected to recording/reproducing apparatus 100 or a switch mounted to recording/reproducing apparatus 100.

Graphic control unit 16 may execute a graphic processing such as an on screen display (OSD) processing with respect to the video signal output by codec 4 and the EPG data output by CPU 12 to generate a video signal to be displayed on television apparatus 20.

Video D/A converter 17 may convert the digital video signal input from graphic control unit 16 to an analog video signal to output the signal to television apparatus 20.

Audio D/A converter 18 may convert the digital audio signal input from codec 4 into an analog audio signal to output the signal to television apparatus 20.

Television apparatus 20 may display the analog video signal on a display unit and output the analog audio signal from a speaker (not shown).

Search server 22 may search contents servers 23 on Internet 21 for a VOD content in response to a request from CPU 12, and notify recording/reproducing apparatus 100 of the search result. Examples of search server 22 may include a server providing a video search application program interface (API) published on Internet 21. Each content server 23 may be a server storing a VOD content and distributes the VOD content via streaming in response to a request by recording/reproduction apparatus 100.

As shown in FIG. 2, an EPG database 31 may store program information for each broadcast date and time slot. The program information may include a title, a broadcast time period, and a cast of the program content of each program. CPU 12 may cause search server 22 to search for a VOD content corresponding to each program content in EPG database 31, and generate a VOD content database 32 describing information regarding the VOD content corresponding to the program content. Corresponding content may be the same as or similar to the program content. The corresponding content may also differ from the program content.

Specifically, CPU 12 may create a search query based on conditions including a title, an episode name, and a broadcast time period (runtime) of each program content in EPG database 31, transmit the query to search server 22 on Internet 21, obtain a search result based on an XML (eXtensible Markup Language) from search server 22 using HTTP (HyperText Transfer Protocol), and create VOD content database 32 for each VOD content corresponding to each program content. VOD content database 32 may be described with an obtainable site (URL) and reproduction conditions including runtime, price type, good/poor image quality, bit rate, distribution period, and presence/absence of advertisements, for each VOD content corresponding to each program content. For example, regarding Program A in EPG database 31, three VOD contents whose obtainable sites (distributors) and reproduction conditions are different from one another may be retrieved. Regarding Program B, two VOD contents whose obtainable sites and reproduction conditions are different from each other may be retrieved. EPG database 31 and VOD content database 32 may be stored, for example, in RAM 14.

Furthermore, when the VOD content is searched for, it is possible to input a search condition conforming to a user's preference.

Referring to FIG. 3, a setup screen 35 of the search condition (hereinafter referred to as VOD filter) may be created by CPU 12 and displayed on the display unit of television apparatus 20. Setup screen 35 of the VOD filter may include filter items (for example, filter item 36) of the VOD content including the image quality, presence/absence of advertisements, and price type which can be set for each genre of the VOD content such as movies, news, sports, and others. For example, the user may operate the remote controller to select a filter displayed in a pull-down menu of a list box 38 for each filter item, and set the filter in each block 37 for each filter item. In the exemplary setup screen 35 shown in FIG. 3, the movie genre is set such that a VOD content having a good image quality and no advertisement is searched for. And, the news genre is set such that a free VOD content is searched for.

The genre selection using setup screen 35 may be executed for each genre information on each program content included in EPG database 31. As such, when a VOD content corresponding to a program content described as being of movie genre in EPG database 31 is searched for, the search is executed in accordance with each filter of the movie genre on setup screen 35.

As shown in FIG. 4, recording/reproducing apparatus 100 may select a broadcast signal of each channel with digital tuner 1 (41), extract EPG data from an SI signal in the broadcast signal of each channel with CPU 12 (42), and generate EPG database 31 (43). Meanwhile, recording/reproducing apparatus 100 may set each filter via operation input unit 15 with setup screen 35 of the VOD filter (45). Then, CPU 12 may control a search for a VOD content using the program information in EPG database 31 such as a title and runtime of a program content and filtering parameters such as good/poor image quality and price type for the genre (46). Specifically, CPU 12 may generate the search query base on the program information and the filtering parameters as described above, transmit the search query to search server 22 via Internet 21, and receive via Internet 21 the result of searching each content server 23 for the VOD content by search server 22. CPU 12 may associate the search result for the VOD content with EPG database 31 to generate VOD content database 32, and cause the display unit of television apparatus 20 to display an EPG 50 reflecting VOD content database 32 (44).

As shown in FIG. 5, EPG 50 may include title fields 51 displaying a program title of each program content broadcasted in a predetermined time slot on each channel. EPG 50 may be displayed, for example, by pressing an EPG key of the remote controller by a user. The user may position a cursor 53 to each title field 51 with the remote controller, and, by pressing an OK key of the remote controller while the cursor is positioned on title field 51 of a desired program content, display a function list (not shown) related to the program content.

Furthermore, each title field 51 may display a VOD icon 52 based on VOD content database 32, identifying that a VOD content corresponding to the program content can be broadcasted via Internet 21.

As shown in FIG. 6, when EPG 50 is displayed, CPU 12 of recording/reproducing apparatus 100 may judge whether title field 51 of a program content is selected with the operation of a user (Step 61). If title field 51 of one program content is selected (Yes), then CPU 12 may read EPG database 31 from RAM 14 (Step 62), refer to VOD content database 32 associated with EPG database 31, and judge whether a VOD content corresponding to the selected program content exists (Step 63).

If the corresponding VOD content exists (Yes), then CPU 12 may judge whether the runtime of the program content is in a distribution period of the VOD content (Step 64). If the runtime of the program content is in the distribution period of the VOD content (Yes), then as shown in FIG. 7, CPU 12 may display a function list 54 such that function list 54 is shown with title field 51 of the selected program content of EPG 50, and display "Play VOD" on function list 54 (Step 65). Function list 54 may be an action list that can be executed when selecting a program content, and may display actions such as "Timer setting" and "Display details" in addition to "Play VOD" as described above. The user may select a desired action on function list 54 using the remote controller to thereby execute the selected action. "Timer setting" may be for setting recording reservation of the selected program, and "Display details" may be for displaying in detail program information on the selected program content such as a program content and cast information. CPU 12 may further display "VOD list" on function list 54 (Step 66). A VOD content to be distributed after broadcasting the program content cannot be viewed when the program content is broadcasted. So, where such a program content is selected in EPG 50 (No in Step 64), "VOD list" may be displayed on function list 54 without displaying "Play VOD."

Where "Play VOD" is selected on function list 54 (Yes in Step 67), as shown with arrow (1) of FIG. 7, CPU 12 may determine a VOD content of the highest priority based on the setting of the VOD filter, i.e., a VOD content conforming to a user's preference, and reproduce via streaming the VOD content in content server 23 via communication unit 11 (Step 69). For example, in content database 32 of FIG. 2, three VOD contents corresponding to a program content of Program A are retrieved. In the example where a user has set the filter on setup screen 35 of the VOD filter as shown in FIG. 3 so as to search for a free VOD having a good image quality, a VOD content existing in website "XXX.com" (the uppermost row of the three VOD contents) may be reproduced.

Furthermore, where "VOD list" is selected in function list 54 (Yes in Step 68), as shown with arrow (2) of FIG. 7, CPU 12 may display VOD list 55 with EPG 50 based on VOD content database 32 (Step 70). VOD list 55 may show information regarding the retrieved VOD contents in descending order of priority based on the VOD filter together with information such as the title and broadcast time slot of the corresponding program content. For example, URL of a VOD content, price type, image quality, bit rate, distribution period, presence/absence of advertisement, etc., may be displayed for each VOD content.

Where there is a VOD content displayed in VOD list 55 that cannot be reproduced because of a restricted broadcast period, the VOD content field on VOD list 55 may be displayed in a pale color or an icon indicating that it cannot be reproduced may be displayed to distinguish the VOD content from other VOD contents that can be reproduced.

Where a user operates the remote controller to move cursor 56 on VOD list 55 and select one VOD content (Yes in Step 71), CPU 12 reproduces the selected VOD content (Step 72) via streaming.

Where a VOD content is broadcasted due to a selection of "Play VOD" or "VOD list" on function list 54, CPU 12 may add information regarding the reproduced VOD content to the title list (Step 73).

As shown in FIG. 8, a title list 80 may display a program content having been recorded on HDD 8 according to the recording reservation set with "Timer setting" on function list 54 and a program content manually recorded without reservation, and title information on the VOD content reproduced with a selection of "Play VOD" or "VOD list" on function list 54. Where a content in title list 80 is a VOD content, VOD icon 52 may be displayed in the title field for identification. A user may move a cursor 82 on title list 80 using the remote controller to select one content, whereby the content can be reproduced. Recording/reproducing apparatus 100 may store a database for title list 80 in HDD 8. In the database, the program content may be associated with a recorded real data, and the VOD content may be associated with a URL of a content server as a distributor of the VOD content. When reproducing a VOD content on title list 80, recording/reproducing apparatus 100 may access the URL with communication unit 11 to execute streaming reproduction. As described above, by registering the VOD content to title list 80 after having been reproduced, the VOD content can be repeatedly reproduced similar to the recorded program content.

Title list 80 may display a thumbnail image 81 in addition to the title information on each program content and VOD content. For a program content, thumbnail image 81 may be a reduced-size image of an opening frame of the recorded real data. Furthermore, for a VOD content, thumbnail image 81 may be a reduced-size image of an opening frame captured when the VOD content is reproduced. Alternatively, where a thumbnail image exists in content server 23 of the VOD content, such thumbnail image may be downloaded and displayed on title list 80.

Furthermore, when reserving recording of a program content, recording/reproducing apparatus 100 may generate a recording reservation list in HDD 8 independent of title list 80, and delete a program content having been recorded from the recording reservation list to add the program content to title list 80.

By displaying VOD icon 52 to identify that there exists a VOD content corresponding to a program content in EPG 50, a user can view without difficulty the VOD content corresponding to the program content without being bound by a broadcast time slot of the program content. Thus, even if the program content has already been broadcasted, it can be reproduced via streaming using EPG 50 in the past.

Furthermore, by selecting "Play VOD" on function list 54 with the VOD filter set, a VOD content conforming to a user's preference can be automatically searched for and reproduced via streaming.

There may be various ways of obtaining contents that can be viewed with VOD and various service modes, so it may be difficult to select a way and service mode conforming to a user's preference. For example, a television drama program broadcasted on Monday can be viewed in real time with a charge from website A and can be viewed for free with advertisements a day after broadcasting from website B. Furthermore, a content of high image quality can be viewed with a charge from website C, and a content of poor image quality can be viewed for free from website D. As such, there may be diverse viewing conditions. Furthermore, a user's demand may not be uniform. That is, the user's preference may vary depending on genres of contents. For example, the user may want to view a news program for free even with a poor image quality and view a drama program as early as possible even with a charge. Consistent with an embodiment of the present invention, a VOD content conforming to a search condition set by a user can be searched for and can be reproduced without difficulty. So, user-friendliness can be remarkably increased in accordance with a user's preference.

There may be a case where a URL of a VOD content described in title list 80 is changed, a reproduction condition of a VOD content is changed (e.g., free content is now charged), or a VOD content is deleted by content server 23. In such a case, the VOD content in title list 80 can be updated accordingly.

As shown in FIG. 9, CPU 12 of recording/reproducing apparatus 100 may access a URL of a VOD content described in title list 80 via communication unit 11 periodically, for example, at 12:00 a.m. everyday (Step 91). Then, CPU 12 may judge whether a VOD content exists in the URL (Step 92), and when the VOD content exists (Yes), CPU 12 may judge whether a reproduction condition of the VOD content conforms to the search condition set with the VOD filter (Step 93).

Where a VOD content does not exist in the URL (No in Step 92) or where the reproduction condition does not conform with the search condition (No in Step 93), CPU 12 may require search server 22 to search Internet 21 for a VOD content in accordance with the search condition of the VOD filter (Step 94). Where a VOD content conforming to the search condition is retrieved as a result of searching (Yes in Step 95), title list 80 is updated with the retrieved VOD content (Step 96). In other words, information regarding the new URL and reproduction condition of the VOD content is updated, thus causing the new VOD content to be capable of being reproduced.

Accordingly, title list 80 can be updated following a change of URL or reproduction condition of a VOD content. Therefore, a user can repeatedly reproduce a VOD content corresponding to a recorded program content and conforming to the user's preference without recognizing that title list 80 was updated.

Reservation recording of a program content may involve a problem where a user accidentally sets recording reservations of a plurality of program contents to be broadcasted on different channels in the same time slot such that the plurality of program contents are overlapped in time with each other. In such as case, if only the latter recording-reservation-target program content is recorded while canceling the primary recording reservation, then the user may miss a desired program content.

Furthermore, reservation recording has another problem where a program content is not entirely recorded when a broadcast time period of the program content broadcasted in a broadcast time slot before a recording-reservation-target program content is extended and a broadcast time period of the recording-reservation-target program content is extended.

The problems involved in reservation recording discussed above may be solved using the VOD content.

As shown in FIG. 10, when recording reservation of a program content is set with function list 54 (Step 101), CPU 12 of recording/reproducing apparatus 100 may judge whether a reservation time slot of the recording reservation is overlapped with a reservation time slot of another recording reservation (Step 102). If the reservation time slots are not overlapped with each other (No), then a program content of the recording reservation target is added to the recording reservation list (Step 106).

If the reservation time slots are overlapped with each other (Yes), CPU 12 may require search server 22 to search for a VOD content corresponding to a program content whose recording reservation was made earlier of the two overlapped program contents in accordance with the VOD filter (Step 103). Where a VOD content conforming to the VOD filter is retrieved as a result of searching (Yes in Step 104), CPU 12 may add the retrieved VOD content to title list 80 (Step 105). Then, CPU 12 may execute recording of a program content whose recording reservation was made later of the two program contents whose recording reservations are overlapped with each other, in accordance with the recording reservation list (Step 107). Furthermore, where a VOD content conforming to the VOD filter is not retrieved (No in Step 104), the recording reservation list is updated with the program content whose recording reservation was made later (Step 106), and executes recording in accordance with the recording reservation list (Step 107).

Where a VOD content corresponding to the program content whose recording reservation is made earlier of the two overlapped program contents is registered in VOD content database 32 in advance, VOD content database 32 may add the VOD content to title list 80 without executing redundant searching.

Overlapped recording reservations may be backed up with a VOD content, and the VOD content may be allowed to be reproduced with title list 80. Therefore, even if broadcast time slots are overlapped with each other, the user does not lose viewing opportunity.

As shown in FIG. 11, when recording reservation of a program content is set with function list 54 (Step 111), CPU 12 of recording/reproducing apparatus 100 may judge whether a broadcast time slot of a recording-reservation-target program content has been changed, for example, by confirming EPG data (Step 112). If the broadcast time slot has not been changed (No in Step 112), the program content is recorded in accordance with the recording reservation list (Step 116).

If the broadcast time slot of the recording-reservation-target program content has been changed (Yes in Step 112), search server 22 may be required to search for a VOD content corresponding to the program content whose recording reservation was made in accordance with the VOD filter (Step 113). Where a VOD content conforming to the VOD filter is retrieved as a result of searching (Yes in Step 114), CPU 12 may add the retrieved VOD content to title list 80 (Step 115).

Where a broadcast time slot of a recording-reservation-target program content has changed and thus cannot be recorded, the program content is backed up with a VOD content and the VOD content is allowed to be reproduced with title list 80. Therefore, the user does not lose viewing opportunity.

Recording/reproducing apparatus 100 may transmit a search query to search server 22 by using, for example, a video search API on Internet 21 to search Internet 21 for a VOD content. Alternatively, recording/reproducing apparatus 100 may include a built-in search engine and search for a VOD content using the search engine without using search server 22.

As shown in FIG. 12, a recording/reproducing apparatus 200 may select a broadcast signal of each channel (241), extract EPG data from an SI signal in the broadcast signal of each channel (242), and generate EPG database 31 (243). Meanwhile, recording/reproducing apparatus 200 may set each filter with setup screen 35 of the VOD filter (245). Then, recording/reproducing apparatus 200 may search Internet 21 for a VOD content with a VOD search engine using the program information in EPG database 31 and the filtering parameters (246). Recording/reproducing apparatus 200 may then associate the search result of the VOD engine with EPG database 31 to thereby generate VOD content database 32 and cause the display unit of television apparatus 20 to display EPG 50 reflecting VOD database 32 (244).

The display of VOD icon 52 in title field 51 on EPG 50 may indicate that a VOD content corresponding to a program content exists. As an alternative to displaying VOD icon 52, title field 51 may be displayed with an intensifying effect such as highlight display or 3-D display to indicate that a VOD content exists.

A VOD content corresponding to a program content may differ in certain attributes, for example, image quality, sound quality bit rate, amount of advertisement, price, aspect ratio, length, parental rating, censorship, language, etc.

Title list 80 may be updated by confirming a URL and reproduction conditions of a VOD content periodically or every time a user instructs to reproduce a VOD content.

In the above-described embodiments, recording reservation of a program content whose recording reservation was made later of program contents whose recording reservations are overlapped with each other is allowed to be effective, and a program content whose recording reservation was made earlier is substituted by a VOD content. Alternatively, the program content whose recording reservation was made earlier may be allowed to be effective and the program content whose recording reservation was made later may be substituted by a VOD content.

In the above-described embodiments, where recording reservations are overlapped in time with each other or a broadcast time period is extended, a program content is substituted by a VOD content added to title list 80. Alternatively, when setting reservation recording, a VOD content corresponding to a reservation-recording-target program content may always be searched for, and where the VOD content is retrieved, a user may be allowed to select one of the following options: set a recording reservation of the program content or add the VOD content corresponding to the program content to title list 80. Thus, where the user selects to add the VOD content, a storage volume in HDD 8 can be reduced as much as possible.

Where a retrieved VOD content is encoded with a format which, under ordinary circumstances, cannot be decoded with recording/reproducing apparatus 100, before displaying VOD icon 52 on EPG 50, the VOD content may be in advance transcoded by codec 4 to a format which can be decoded.

A program content may be broadcasted through, for example, radio waves or an IP network. Furthermore, a program content may be a video content or an audio content. Where a program content is an audio content, a corresponding content retrieved from a network may be, for example, on-demand listening on the Internet.

The broadcast program may include programs of digital television broadcasting, analog television broadcasting, digital radio (audio) broadcasting, AM (amplitude modulation) radio broadcasting, FM (frequency modulation) radio broadcasting, IP (internet protocol) television broadcasting, and IP radio broadcasting. The electronic apparatus may include any electronic apparatus such as a PC (Personal Computer), a television apparatus, a radio receiver apparatus, a recording/reproducing apparatus such as a personal video recorder (PVR), a mobile phone apparatus, and a game apparatus. The content may include a video content and an audio content provided by VOD. The network may include the Internet, LAN (local area network), and wireless LAN. The first and second reception means may be implemented by multiple pieces of hardware or by a single piece of hardware. The first and second reception means may include, for example, a digital tuner, an analog tuner, and a network interface. The retrieval means may causing another search engine such as a search server existing on the network to execute the retrieving. The identification information may be, for example, an icon showing that the retrieved content exists or may be implemented by displaying a program information field of the broadcast program with intensifying effects such as highlight display or 3-D display.

Embodiments consistent with the invention have been described with reference to the accompanying drawings. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, micro-processors and the like. Additionally, although aspects of the invention are described for being stored in memory, one skilled in the art will appreciate that these aspects can also be stored on other types of computer-readable media, such as secondary storage devices, for example, hard disks, magnetic disks, optical disks, solid state memory, or other forms of RAM or ROM.

Computer programs based on the written description and methods of this invention are within the skill of an experienced developer. The various programs or program modules can be created using any of the techniques known to one skilled in the art or can be designed in connection with existing software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. An electronic apparatus, comprising:
   first reception means for receiving a first broadcast program having a first program content;
   second reception means for receiving electronic program guide data including program information on the first broadcast program;
   retrieval means for retrieving a first content corresponding to the first program content of the first broadcast program from a network, based on the electronic program guide data;
   recording means for recording at least the first broadcast program and location information associated with the first content; and
   display means for displaying identification information identifying the first content such that the identification information is shown with the program information, wherein the retrieval means comprises:
   means for judging whether the first content is located at a first location on the network;
   means for retrieving, when the first content is not located at the first location, a second content corresponding to a second program content of a second broadcast program from a second location on the network, and adding the second content to a recorded program list, and
   means for updating the location information to include the second location, when the first content is not located in the first location.

2. The electronic apparatus of claim 1, further comprising:
   reproduction means for reproducing the first broadcast program, receiving the first content corresponding to the identification information via the network, and reproducing the first content.

3. The electronic apparatus of claim 2, further comprising:
   input means for inputting an operation by a user, wherein:

the display means displays a content list indicating contents with locations on the network and reproduction conditions together with the electronic program guide data; and
the reproduction means reproduces one of the contents selected by an operation of the user.

4. The electronic apparatus of claim 2, further comprising:
input means for inputting retrieval condition information, wherein the retrieval means retrieves the first content based on the retrieval condition information.

5. The electronic apparatus of claim 4, wherein, when a plurality of contents conforming to the retrieval condition information are retrieved, the reproduction means judges a priority order of the plurality of contents based on the retrieval condition information and reproduces one of the plurality of contents judged to have the highest priority order.

6. The electronic apparatus of claim 4, wherein:
the program information includes genre information regarding a genre of the first broadcast program;
the input means inputs the retrieval condition information for the genre of the first content, and
the retrieval means judges the genre of the first content to be retrieved based on the genre information and retrieves the first content based on the condition information on the judged genre.

7. The electronic apparatus of claim 4, further comprising:
generation means for generating the recorded program list indicating the recorded first broadcast program such that the recorded first broadcast program can be reproduced by the reproduction means; and
control means for adding the first content received via the network and for reproducing by the reproduction means the recorded program list such that the first content can be reproduced again.

8. The electronic apparatus of claim 7, further comprising:
reservation means for setting a first recording reservation of the first broadcast program in a predetermined time slot, wherein, when a first recording reservation of the first broadcast program to be broadcasted on a first channel in the predetermined time slot is overlapped with a recording reservation of a third broadcast program to be broadcasted on a corresponding channel in the predetermined time slot, the control means controls the recording means to record the first broadcast program based on the first recording reservation and controls the retrieval means to retrieve a third content corresponding to a third program content of the third broadcast program from the network and add the third content to the recorded program list such that the third content can be reproduced by the reproduction means.

9. The electronic apparatus of claim 7, further comprises:
reservation means for setting a first recording reservation of the first broadcast program in a predetermined time slot, wherein, when the predetermined time slot is changed after setting the first recording reservation, the retrieval means retrieves a third content corresponding to the first content of the first broadcast program from the network and adds the third content to the recorded program list such that the retrieved third content can be reproduced by the reproduction means.

10. The electronic apparatus of claim 7, wherein:
the recording means records location information including the first location on the network in which the first content is located;
the means for judging determines whether the first content conforms to the retrieval condition information;

the means for retrieving retrieves, when the first content does not conform to the retrieval condition information, the second content corresponding to the second program content of the second broadcast program from the network, and adds the second content from the second location on the network to the recorded program list; and
the means for updating updates the location information from the first location to the second location, when the first content does not conform to the retrieval condition information.

11. A content reproduction method, comprising:
receiving a first broadcast program having a first program content;
receiving electronic program guide data including program information on the first broadcast program;
retrieving a first content corresponding to the first program content of the first broadcast program from a network based on the electronic program guide data;
recording at least the first broadcast program and location information associated with the first content; and
displaying identification information identifying the first content such that the identification information is shown with the program information,
wherein the retrieving comprises:
judging whether the first content is located at a first location on the network;
retrieving, when the first content is not located at the first location, a second content corresponding to a second program content of a second broadcast program from a second location on the network, and adding the second content to a recorded program list, and
updating the location information to include the second location, when the first content is not located in the first location.

12. The method of claim 11, further comprising:
reproducing the first broadcast program;
receiving the first content corresponding to the identification information via the network;
reproducing the first content; and
inputting retrieval condition information, wherein the retrieving of the first content is based on the retrieval condition information.

13. The method of claim 12, further comprising:
generating the recorded program list indicating the recorded first broadcast program such that the recorded first broadcast program can be reproduced;
adding the first content received via the network; and
reproducing the recorded program list such that the first content can be reproduced again.

14. The method of claim 13, further comprising:
setting a recording reservation of the first broadcast program in a predetermined time slot; and
when the recording reservation of the first broadcast program to be broadcasted on a first channel in the predetermined time slot is overlapped with a recording reservation of a third broadcast program to be broadcasted on a corresponding channel in the predetermined time slot, recording the first broadcast program based on the first recording reservation, retrieving a third content corresponding to a third program content of the third broadcast program from the network, and adding the third content to the recorded program list such that the third content can be reproduced.

15. A non-transitory computer-readable medium having computer programs which when executed by a processor cause an electronic apparatus to perform a content reproduction method, the method comprising:

receiving a first broadcast program having a first program content;

receiving electronic program guide data including program information on the first broadcast program;

retrieving a first content corresponding to the first program content of the first broadcast program from a network based on the electronic program guide data;

recording at least the first broadcast program and location information associated with the first content; and displaying identification information identifying the first content such that the identification information is shown with the program information, wherein the retrieving comprises:

judging whether the first content is located at a first location on the network;

retrieving, when the first content is not located at the first location, a second content corresponding to a second program content of a second broadcast program from a second location on the network, and adding the second content to a recorded program list, and updating the location information to include the second location, when the first content is not located in the first location.

16. The non-transitory computer-readable medium of claim 15, wherein the method further comprises:

reproducing the first broadcast program;

receiving the first content corresponding to the identification information via the network;

reproducing the first content; and inputting retrieval condition information, wherein the retrieving of the first content is based on the retrieval condition information.

17. The non-transitory computer-readable medium of claim 16, wherein the method further comprises:

generating the recorded program list indicating the recorded first broadcast program such that the recorded first broadcast program can be reproduced;

adding the first content received via the network; and reproducing the recorded program list such that the first content can be reproduced again.

18. The non-transitory computer-readable medium of claim 17, wherein the method further comprises:

setting a recording reservation of the first broadcast program in a predetermined time slot; and when the recording reservation of the first broadcast program to be broadcasted on a first channel in the predetermined time slot is overlapped with a recording reservation of a third broadcast program to be broadcasted on a third channel in the predetermined time slot, recording the first broadcast program based on the first recording reservation, retrieving a third content corresponding to a third program content of the third broadcast program from the network, and adding the third content to the recorded program list such that the third content can be reproduced.

* * * * *